United States Patent [19]

Hashimoto

[11] Patent Number: 4,741,626
[45] Date of Patent: May 3, 1988

[54] PYROELECTRIC THERMAL SENSOR
[75] Inventor: Kaoru Hashimoto, Toyohashi, Japan
[73] Assignee: Minolta Camera Kabushiki Kaisha, Osaka, Japan
[21] Appl. No.: 927,079
[22] Filed: Nov. 5, 1986
[30] Foreign Application Priority Data
Nov. 11, 1985 [JP]  Japan .................. 60-252405
[51] Int. Cl.⁴ .............................................. G01J 5/62
[52] U.S. Cl. ................................... 374/133; 374/128; 374/121; 356/43
[58] Field of Search ............... 374/120, 127, 128, 130, 374/132, 133, 121; 356/43, 44, 45; 219/502

[56] References Cited
U.S. PATENT DOCUMENTS

| | | | |
|---|---|---|---|
| 2,879,401 | 3/1959 | Chicurel | 374/121 |
| 3,057,200 | 10/1962 | Wood | 374/132 |
| 3,293,915 | 12/1966 | Banca et al. | 374/133 |
| 3,354,773 | 11/1967 | Shreve | 374/130 |
| 3,453,432 | 7/1969 | McHenry | |
| 3,641,345 | 2/1972 | Coackley et al. | 374/127 |
| 3,742,191 | 6/1973 | Poole et al. | 219/496 |
| 3,849,628 | 11/1974 | Abowitz et al. | 219/216 |
| 4,427,306 | 1/1984 | Adamson | 374/128 |
| 4,527,896 | 7/1985 | Irani et al. | 374/133 |
| 4,556,779 | 12/1985 | Hashimoto et al. | 219/502 |
| 4,561,786 | 12/1985 | Anderson | 374/128 |

FOREIGN PATENT DOCUMENTS
2816580 4/1978 Fed. Rep. of Germany .

Primary Examiner—William A. Cuchlinski, Jr.
Assistant Examiner—Thomas B. Will
Attorney, Agent, or Firm—Burns, Doane, Swecker & Mathis

[57] ABSTRACT

A pyroelectric thermal sensor for measuring the surface temperature of an object on a non-contact basis using the signals produced by a pyroelectric element and a reference thermal sensor is operative to reduce the level of the output signal from the pyroelectric element proportionally by switching an interruptive time for interrupting a heat ray incident to the pyroelectric element when the output of an amplifier for amplifying the pyroelectric element signal approaches the state of saturation.

6 Claims, 12 Drawing Sheets

FIG.7
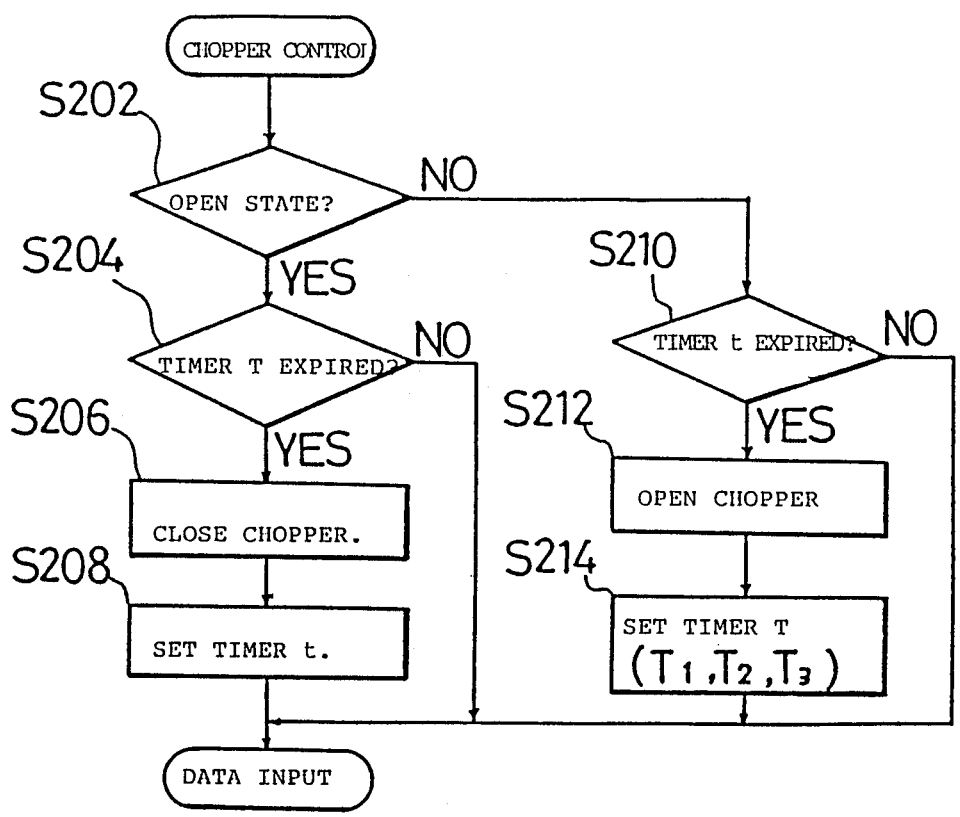
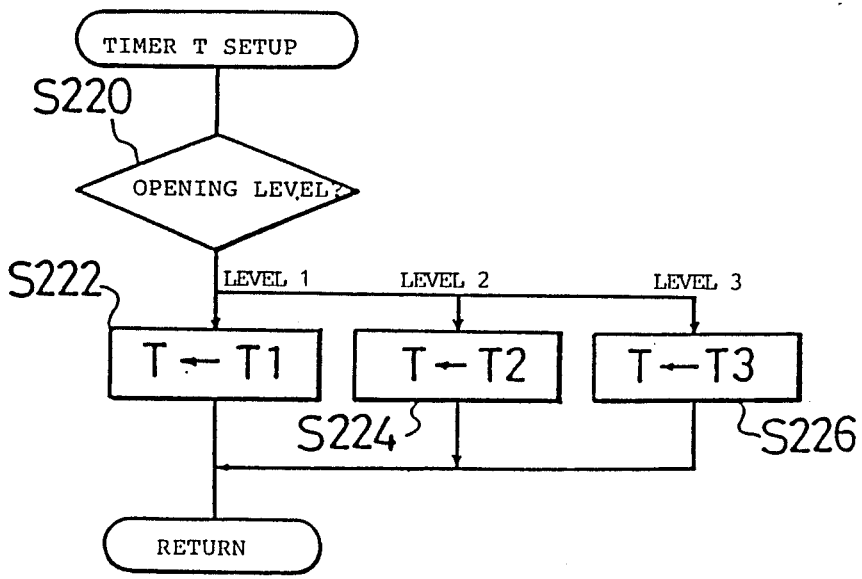

ial in the low-temperature range. On this account, if the
amplifier gain is set so that the output V200 for 200° C.
(V200 is equivalent to the Vfr) is equal to VDD/2, the

PYROELECTRIC THERMAL SENSOR

BACKGROUND OF THE INVENTION

1. Field of the Invention

A present invention relates to a pyroelectric thermal sensor having an extended temperature measuring range.

The pyroelectric thermal sensor of the present invention is operative to extend the temperature measuring range, which has been limited due to the saturation voltage of the amplifier, without switching the amplifier, the sensor being useful for the temperature control of the fixing heat rollers for electrophotography.

2. Prior Art

FIG. 13 is a block diagram explaining the conventional pyroelectric thermal sensor, and FIG. 14 is a waveform diagram showing the output signals at various portions of FIG. 13.

As shown in the figure, the pyroelectric thermal sensor includes a heat ray interrupting means 1 controlled by driving controller 20 which interrupts the heat ray 90 radiated from an object 9 under temperature measurement, a pyroelectric element 3 disposed in the rear of the interrupting means 1 and operates to detect the difference between its periphery temperature and the surface temperature of the object 9, and a reference thermal sensor 6 which detects the temperature in the periphery of the pyroelectric element 3.

The outputs of the pyroelectric element 3 and the reference thermal sensor 6 are amplified by the amplifiers 4 and 60, respectively, to produce the pyroelectric element amplified output (B) and reference thermal sensor amplified output (C), and these output signals are composed by the adding circuit 80 to produce the summed output (D) representing the surface temperature of the object 9. In other words, the surface temperature of the object 9 is given as a sum of the outputs of the pyroelectric element 3 and the reference thermal sensor 6. The composed temperature signal is processed by a microcomputer or the like, and then used for controlling the temperature indicator 91, the heater 92 or the like.

FIG. 15 shows a commonly used amplifier, and FIG. 16 explains the output level of the amplifier. The illustrated amplifier has its output Vo given as:

$$Vo = -(Rf/Ri)Vin \quad (1)$$

Namely, the gain of the amplifier can be adjusted by the value of the feedback resistor Rf.

The output level of the amplifier is saturated at its driving voltage VDD as shown in FIG. 16. On this account, the gain of the amplifier is generally set so that a most frequent occurring output level Vfr is about VDD/2.

In the following, it is intended to apply this idea to the pyroelectric thermal sensor. For example, when a pyroelectric thermal sensor is used for controlling the temperature of the electrophotographic fixing heat roller, the controlled temperature is generally around 200° C. A pyroelectric element used in the pyroelectric thermal sensor has its output in the function of the fourth power of the detected temperature, and therefore the pyroelectric element produces a very small output signal in the low-temperature range. On this account, if the amplifier gain is set so that the output V200 for 200° C. (V200 is equivalent to the Vfr) is equal to VDD/2, the measurable temperature range will be 100~230° C. and it is difficult to measure a temperature below 100° C.

In the operation of the heat roller, if the temperature in the above-mentioned low temperature range cannot be detected, checking for the abnormalities of the heater and the sensor will be deterred in the initial phase, resulting possibly in a damage to the heat roller or the sensor.

Conceivable methods for overcoming the above problem include selective use of amplifier and change of the amplifier gain. These methods, however, requires a complicated circuit structure and therefore results in a degraded reliability.

SUMMARY OF THE INVENTION

Under the foregoing circumstances, the present invention is intended to provide a novel pyroelectric thermal sensor which overcomes the aforementioned problem by manipulating the input signal to the amplifier.

The present invention is to prevent the saturation of the amplifier output by varying the chopping time (interruptive time) of the heat ray incident to the pyroelectric element, thereby expanding the temperature measuring range.

FIG. 1 is a block diagram showing the arrangement of this invention. Namely, the present invention resides in a pyroelectric thermal sensor comprising a heat ray interrupting means 1 which interrupts the heat ray 90 radiated from an object 9 under temperature measurement; a driving controller 2 for driving the interrupting means 1 in a preset interruptive time; a pyroelectric element 3 disposed in the rear of the heat ray interrupting means 1 and adapted to produce an electrical signal at a level corresponding to an ambient temperature and an intensity of the heat ray 90 incident through the interrupting means 1; an amplifier 4 for amplifying the electrical signal produced by the pyroelectric element 3; a level detection means 5 which detects the level of the output signal from the amplifier 4 and produces an interruptive time switching signal when the level of the output signal has reached a predetermined value; a reference thermal sensor 6 which produces an electrical signal at a level corresponding to a temperature in the periphery of the pyroelectric element 3; an interruptive time setting means 7 which receives the interruptive time switching signal, sets an interruptive time for the interrupting means 1, and issues an interruptive time setting signal to the driving controller 2; and a temperature calculating means 8 which calculates the surface temperature of the object 9 from the electrical signals provided by the amplifier 4, the reference thermal sensor 6 and the set up interruptive time.

According to the present invention, the thermal sensor for measuring the surface temperature of an object on a non-contact basis using the signals produced by the pyroelectric element and the reference thermal sensor is operative to reduce the level of the output signal from the pyroelectric element proportionally by switching the interruptive time for interrupting the heat ray incident to the pyroelectric element when the output of the amplifier for amplifying the pyroelectric element signal is saturated (or approaches the state of saturation), whereby the amplifier output is prevented from saturation and the temperature measuring range is extended.

In preventing the amplifier saturation, the inventive arrangement does not necessitate switching of multiple amplifiers nor adjusting of the amplifier gain, but simply reduces the amplifier input signal level proportionally and processes the lowered-level signal by making reference to the tables stored in the microcomputer. In consequence, the hardware structure is not much complex and therefore reliability is high.

Use of the inventive thermal sensor for the temperature control for the electrophotography fixing heat roller allows the measurement of a low temperature range owing to its extended measuring range, which enables prompt detection of abnormalities, whereby damages to the heater, sensor and heat roller can be prevented.

BRIEF DESCRIPTION OF THE DRAWINGS

The present invention will now be described with reference to the accompanying drawings wherein:

FIG. 7 is a flowchart showing in detail the driving control process (S106 in FIG. 6) for the chopper disc.

DETAILED DESCRIPTION OF THE INVENTION

Figure 1:
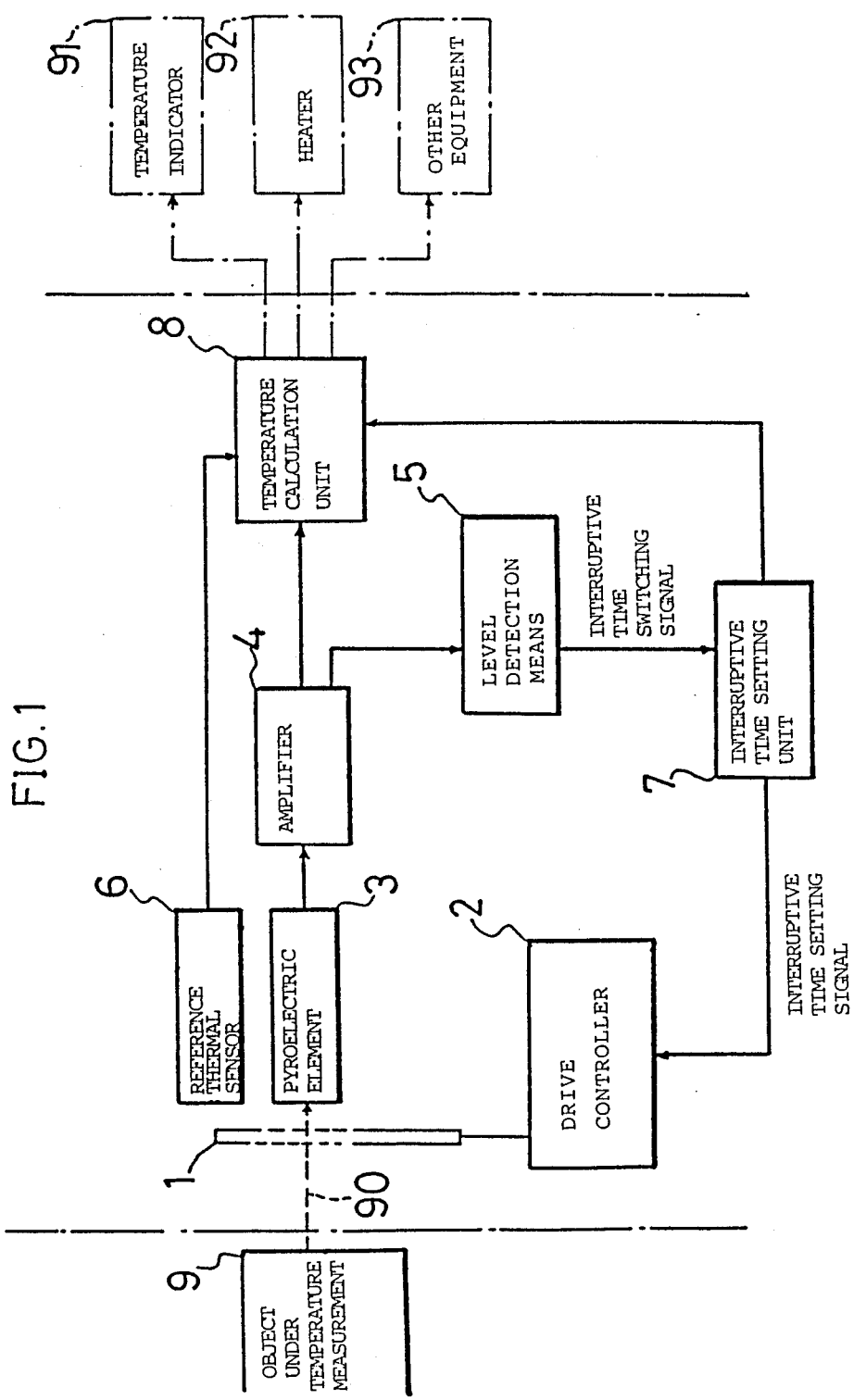
FIG. 1 is a block diagram showing the arrangement of this invention.

The following describes each of the components.

The heat ray interrupting means 1 and driving controller 2 may be a motor and a motor-driven slit disc disposed between the object 9 and the pyroelectric element 3 and operative to allow and disallow the view of the object 9 from the pyroelectric element 3.

The pyroelectric element 3 absorbs the heat ray 90, makes spontaneous polarization in proportion to the amount of the absorbed heat ray and produces an electrical signal transitionally in response to the spontaneous polarization. This signal is generally led out of the pyroelectric element 3 as a voltage level through a serial resistor. The pyroelectric element 3 may be of a conventional type such as PZT and $PbTiO_3$.

The level detection means 5 detects that the output of the amplifier 4 has reached the saturation level (or the level in a certain relation with the saturation level). The level detection means 5 may be a switching transistor which becomes conductive (or non-conductive) at the saturation level. Alternatively, it may be constructed on a software basis using a microcomputer.

The reference thermal sensor 6 detects the temperature in the periphery of the pyroelectric element 3, and it may be a diode thermal sensor, thermistor, thermocouple, transistor, or the like.

The interruptive time setting means 7 sets up the heat ray interruptive time operated by the interrupting means 1 and driving controller 2 in response to the interruptive time switching signal. Interruptive time setting may be of the form of changing duty cycle through the setting of both conductive time and non-conductive time, or of the form of changing period or frequency with a constant duty cycle. Alternatively, one of preset interruptive times may be selected sequentially in synchronism with the entry of the interruptive time switching signal.

The temperature calculation means 8 calculates the surface temperature of the object 9 in response to the signals from the pyroelectric element 3 and the reference thermal sensor 6 in consideration of the calculation table may be the setup interruptive time. Both of the temperature calculation means 8 and interruptive time setting means 7 are constructed on a software basis using a microcomputer.

In applying the signal from the reference thermal sensor 6 to the temperature calculation means 8 via an amplifier, a care should be taken for the adjustment of gain of this amplifier and that of the amplifier 4 for amplifying the signal from the pyroelectric element 3.

Figure 2:
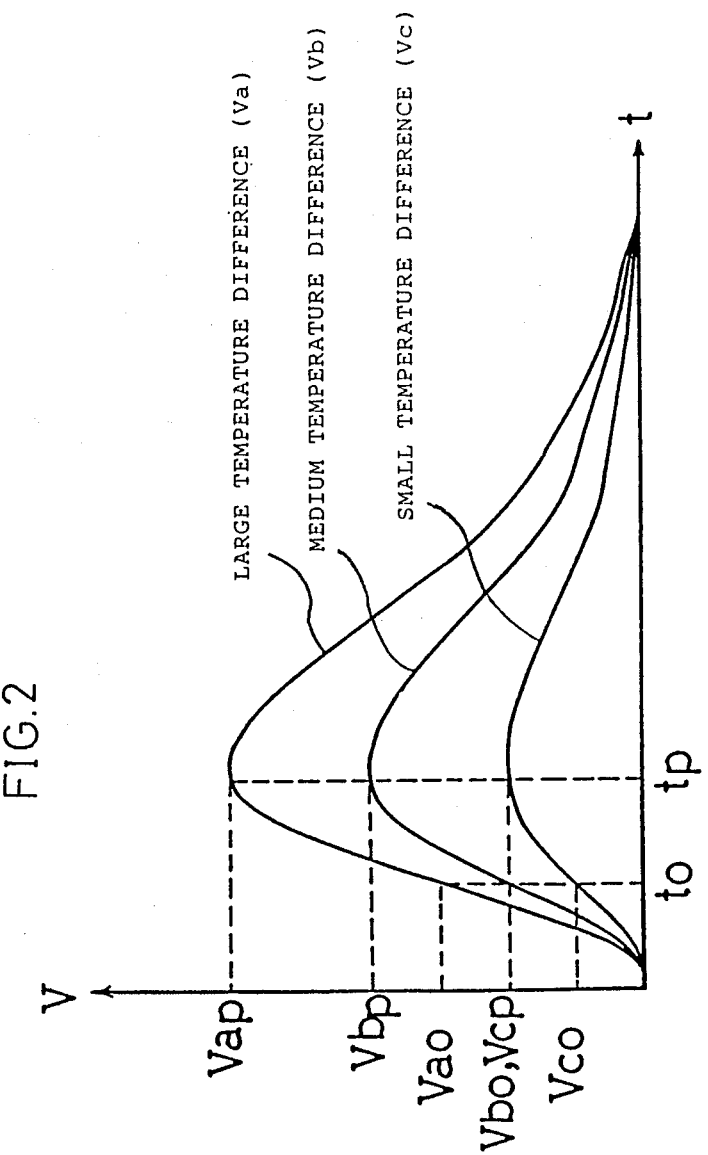
FIG. 2 shows the output waveforms Va, Vb and Vc of the pyroelectric element 3 in the case of a large, medium and small temperature differences, respectively.

FIG. 2 shows the output waveforms Va, Vb and Vc of the pyroelectric element 3 with a large, medium and small temperature differences, respectively. As shown in the figure, the output waveforms of the pyroelectric element 3 have invariably the same ratio (ratio of output levels at an arbitrary time point). For example, at time tp when the output level reaches the peak, $$Vap:Vbp:Vcp=3:2:1 \tag{2}$$

And, at an arbitrary time to, $$Vao:Vbo:Vco=3:2:1 \tag{3}$$

In other words, if it is intended to amplify the signal without changing the above-mentioned output ratio, a signal sampled at an arbitrary time point may be amplified.

The present invention is based on this principle, and the saturation of the amplifier output is prevented by shifting the sampling time point.

The following is the action of this invention.

The heat ray 90 radiated from the surface of the object 9 under temperature measurement is interrupted in a predetermined period and duty cycle by the interrupting means 1, and it is incident to the pyroelectric element 3. The pyroelectric element 3 absorbs the incident heat ray 90, with the result of a spontaneous polarization, and produces an electrical signal representing the temperature difference between the periphery of the pyroelectric element and the surface of the object under measurement.

The reference thermal sensor 6 produces an electrical signal representing the temperature in the periphery of the pyroelectric element 3.

These two signals are composed by the temperature calculation means 8 to produce a signal representing the surface temperature of the object 9, and the signal is used for controlling the temperature indicator 91, the heater 92 and other equipment 93.

During the operation, if the output of the amplifier 4 is saturated (or approaches the state of saturation), it is detected by the level detection means 5, which then produces a interruptive time switching signal. This causes the setting of a new interruptive time, and the heat ray 90 is incident to the pyroelectric element 3 for a reduced time length (conduction time). In other words, the sampling time point is changed as a result. Accordingly, the output of the pyroelectric element 3 is sampled before the output waveform reaches the peak, and the value of the sampled waveform is lowered. Consequently, the amplifier 4 receives a lower input signal level, and its output is prevented from saturation.

The temperature calculation means 8 compensates the output signal of the amplifier 4 in accordance with the table which is relevant to the newly set interruptive time, thereby evaluating a correct temperature.

DESCRIPTION OF THE PREFERRED EMBODIMENT

A specific embodiment of this invention will be described in the following.

The pyroelectric thermal sensor of this embodiment is used for controlling the temperature of the fixing heat roller equipped in the copying machine.

Figure 3:
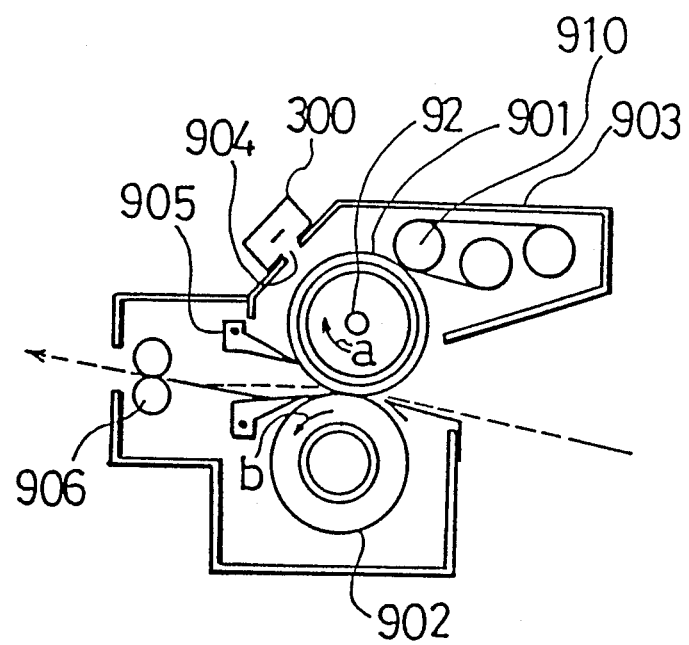
FIG. 3 is a simplified structural diagram showing the fixing heat roller used in a copying machine.

FIG. 3 is a diagram showing in brief the structure of the fixing heat roller equipped in the copying machine. The fixing heat roller comprises of an upper heat roller 901 which incorporates a heater (halogen lamp) 92 and rotates in the direction indicated by the arrow a and a lower heat roller 902 which rotates in the direction indicated by the arrow b by being in press contact with the upper heat roller 901. The roller assembly is accommodated in a case 903.

A piece of copying paper with a toner image being formed thereon by a photosensitive drum (not shown) is fed in from the right, heated and pressed by the rollers 901 and 902 so that the toner image is fixed on the copying paper, and then sent out to the left by a discharge roller 906. Toner left on the roller in the fixing operation is removed by a cleaning web 910. Reference number 905 denotes a pair of separation nails.

In the foregoing arrangement of the fixing heat roller, the pyroelectric thermal sensor 300 of the present invention is disposed such that the chopper disc in the sensor 300 is located at the opening 904 of the case 903 (in the upper left portion of the figure).

Figure 4:
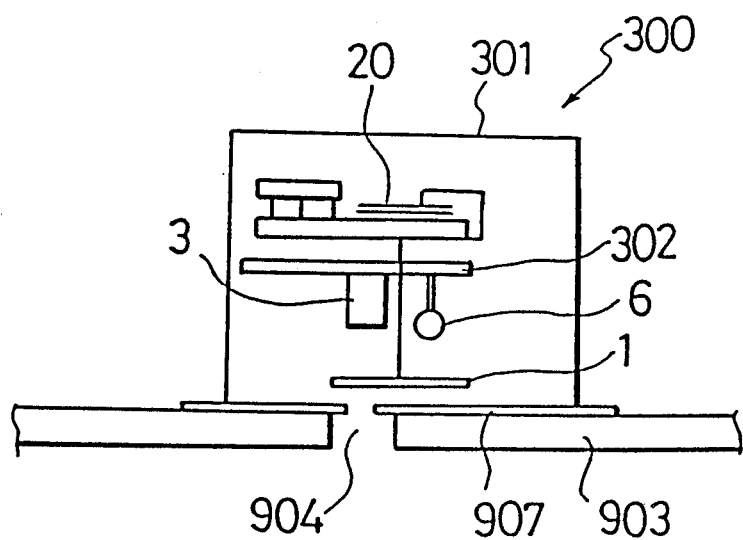
FIG. 4 is a schematic diagram showing in brief the arrangement of the pyroelectric thermal sensor of the embodiment in the present invention.

FIG. 4 is a schematic diagram showing in brief the pyroelectric thermal sensor of this embodiment. The pyroelectric thermal sensor 300 is fixed to the heat roller case 903 with a thermal insulator 907 being placed therebetween, so that the opening of the metallic case 301 is located at the opening 904 of the heat roller case 903. An intermediate plate 302 is disposed in the virtually central portion of the metallic case 301, and a pyroelectric element 3 and a diode sensor 6 which functions as a reference thermal sensor are planted on a printed board which is mounted on the opening side of the intermediate plate 302.

Between the pyroelectric element 3 and the opening 904, there is disposed a chopper disc 1, which functions as a heat ray interrupting means, with semicircular open section and closed section being arranged thereon, and the chopper disc 1 is driven by a stepping motor 20.

Figure 5:
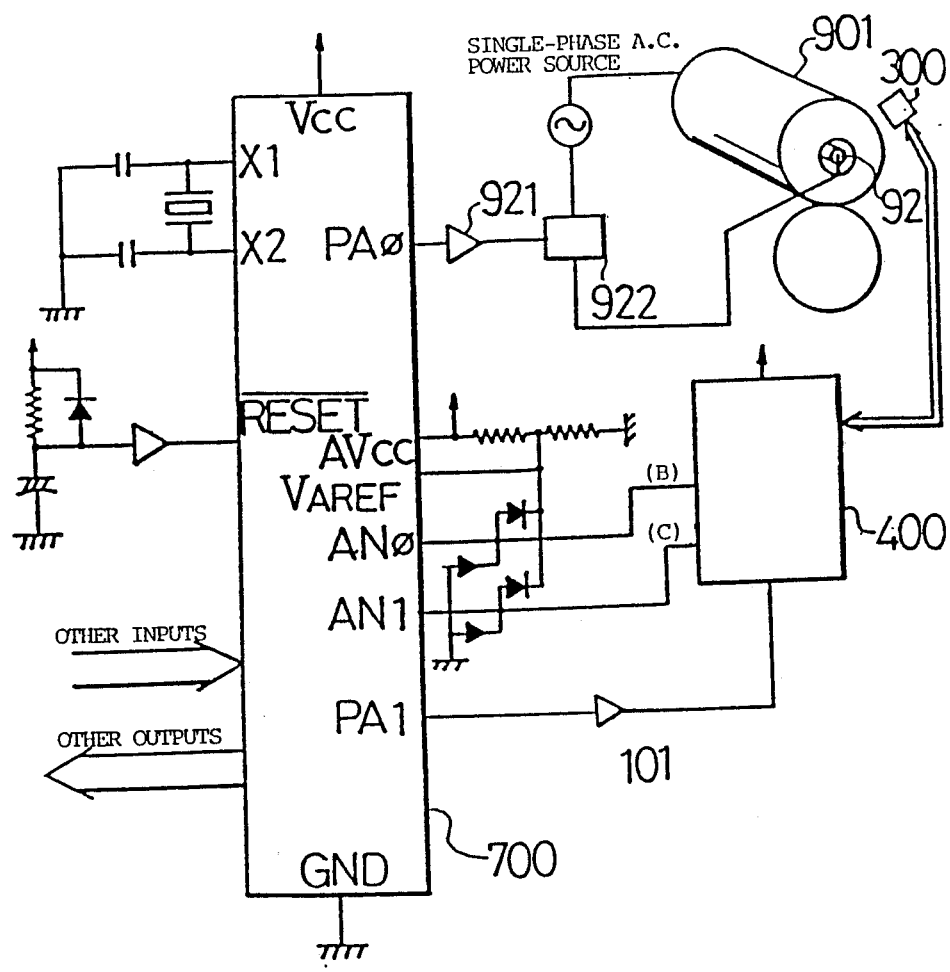
FIG. 5 is a schematic diagram explaining the electrical arrangement of the embodiment.

FIG. 5 is a diagram explaining the electrical arrangement of this embodiment. The signals from the pyroelectric thermal sensor 300 disposed in close vicinity to the upper heat roller 901 are fed through the processing circuit 400 including amplifiers and the like, and received by the microcomputer 700 at its analog input ports AN0 and AN1. The input signals are transformed into digital data by the A/D converter incorporated in the microcomputer 700, and after being processed by the microcomputer outputted as data for driving the heater 92 from the output port PA0. Reference number 922 denotes a heater driving relay, and 921 denotes a relay driver.

The microcomputer 700 provides at its output port PA1 data indicative of the chopping frequency or duty cycle for the chopper disc 1, and it operates on the driver 101 to drive the chopper disc 1.

The microcomputer 700 is connected through a bus line with another microcomputer which implements the sequence control for the copying machine, and the following temperature control is carried out in accordance with the commands.

Figure 6:
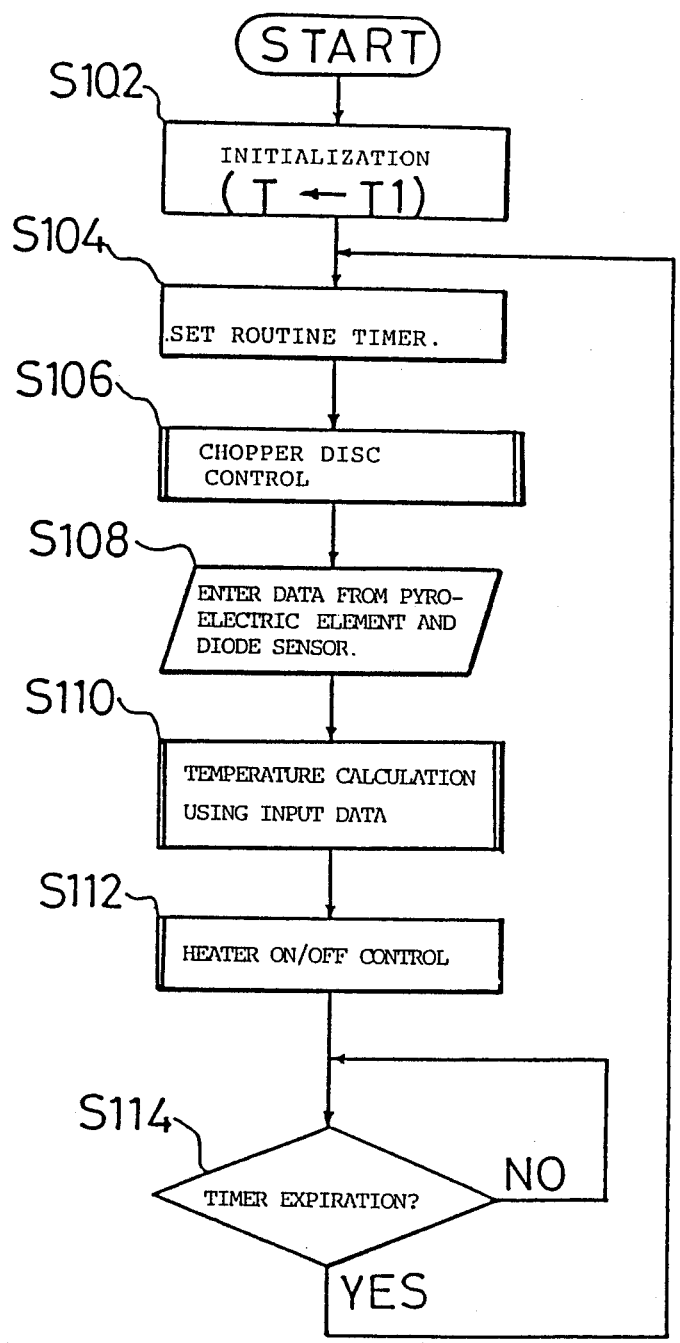
FIG. 6 is a flowchart explaining the overall temperature control process for the heat roller.

FIG. 6 is a flowchart explaining the overall heat roller temperature control.

With the main switch of the copying machine being turned on, the microcomputer 700 starts operating, and it initializes the system at step S102. By this operation, RAM data is cleared and the port outputs are initialized so that the heater 92 and chopper disc 1 are placed in an off state. The chopper disc open time T (i.e., the conduction time length in which the semicircular open section of the chopper disc 1 is located between the object 9 and the pyroelectric element 3 so that the heat ray irradiates the pyroelectric element 3) is set to T1, and the chopper disc closed time t (i.e., the non-conduction time length in which the semicircular closed section of the chopper disc 1 is located between the object 9 and pyroelectric element 3 so that the heat ray does not irradiate the pyroelectric element 3) is set to t1.

In the subsequent step S104, the timer in the temperature control routine is set, and in step S106 the driving control for the chopper disc 1 is carried out (this control step will be described in detail later).

In the next step S108, the microcomputer receives data derived from the pyroelectric element 3 and diode sensor 6 (this input step will be described in detail later).

In step S110, the microcomputer calculates the temperature difference and temperature basing on the signals from the pyroelectric element 3 and diode sensor 6 (this calculation step will be described in detail later).

In step S112, the power on/off control for the heater 92 is carried out (this control step will be described in detail later), and in step S114, the time expiration in the temperature control routine is judged, and the sequence returns to step S104.

Figure 8:
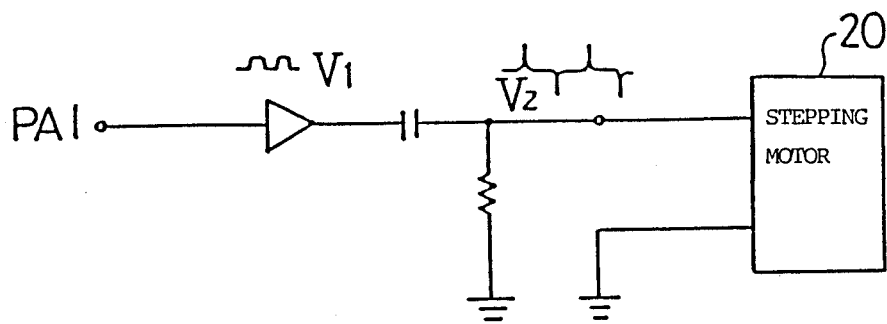
FIG. 8 is a diagram showing in detail the driving circuit for the stepping motor.
Figure 9:
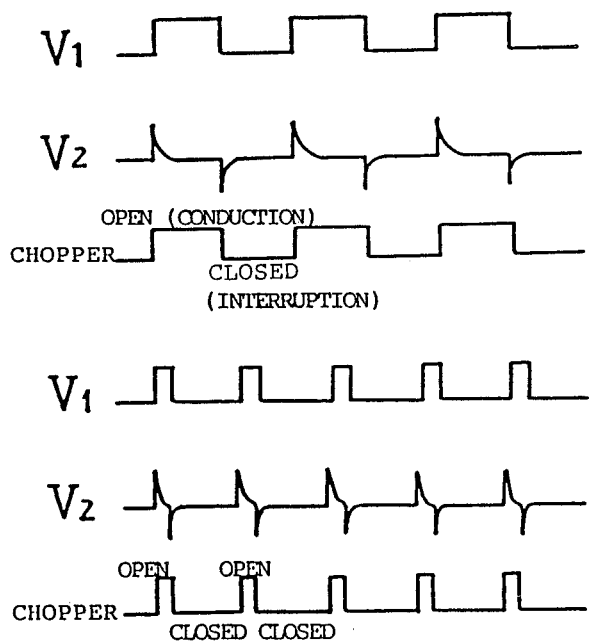
FIG. 9 is a waveforem diagram explaining the open/closed states of the chopper disc.

FIG. 7 is a flowchart showing in detail the process of driving control (S106 in FIG. 6) for the chopper disc 1. FIG. 8 is a diagram showing the driving circuit for the stepping motor 20, and FIG. 9 is a waveform diagram explaining the open/closed states of the chopper disc 1.

The driving control for the chopper disc 1 is carried out as follows.

In step S202, it is judged whether the chopper disc 1 is in a open state or closed state and, if it is found open, the sequence proceeds to step S204 in which the time expiration of the timer T for defining the open time length is judged. The timer T is initially preset to T1. If the timer expiration is detected, the sequence proceeds to step 206 in which the chopper disc 1 is brought to a closed state, and thereafter the timer t for defining the closed time length is set in step S208. The value of t is t1 invariably in this embodiment.

On the other hand, if the test step S202 has detected the closed state of the chopper disc 1, the sequence proceeds to step S210 in which the time expiration of the timer t for defining the closed time length is judged. If the timer expiration is detected, the sequence proceeds to step S212 in which the chopper disc 1 is brought to an open states, and thereafter the timer T for defining the open time length is set in step S214.

In the above description, bringing the chopper disc 1 to a closed state (S206) or to an open state (S212) is practically implemented as follows.

In step S212, when the microcomputer 700 issues a signal for making the chopper disc 1 open (a high-level signal: see V1 in FIG. 9) at the output port PA1, the signal is processed by the differentiation circuit (see V2 in FIG. 9), and the chopper disc 1 is brought to an open state synchronously in response to a rising of the signal.

In step S206, when the microcomputer issues a signal for making the chopper disc 1 closed (a low-level signal; see V1 in FIG. 9) at the output port PA1, the signal is processed by the differentiation circuit (see V2 in FIG. 9), and the chopper disc 1 is brought to a closed state synchronously in response to a falling of the signal.

In this way, the open/closed state of the chopper disc 1 is controlled. In the above description, the timer T for defining the open time length has setting values T1, T2 and T3 in correspondence to level 1, level 2 and level 3 (S222–S226), respectively, based on the test result of the opening level in step S220. The opening level is switched in response to the saturation of the output of the amplifier 4, and it defines the open time length for the chopper disc 1. In this embodiment, three levels of level 1, level 2 and level 3 are set in advance.

Figure 10:
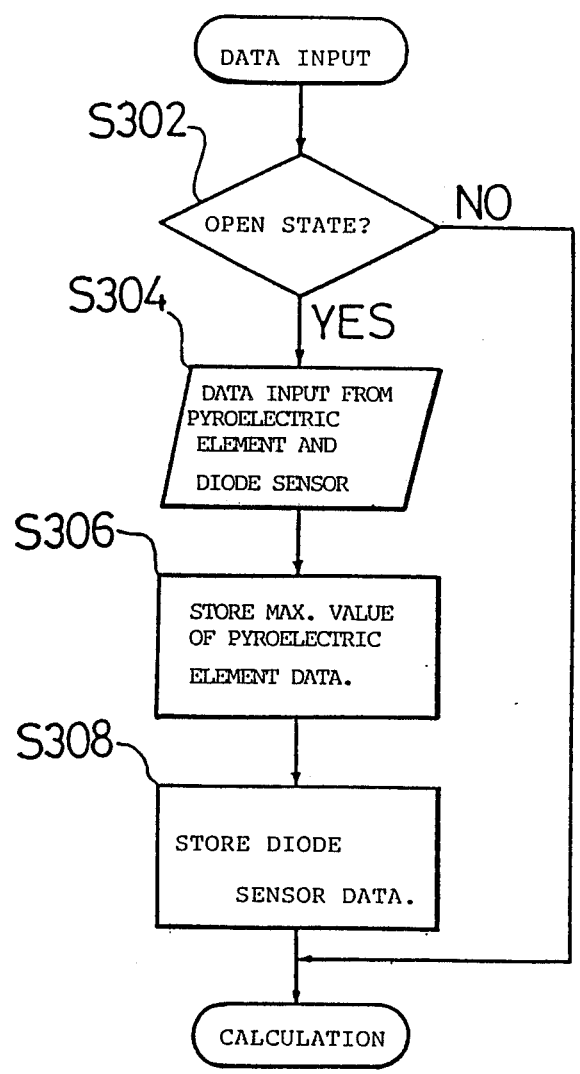
FIG. 10 is a flowchart showing in detail the data input process (S108 in FIG. 6) for the detected signals by the pyroelectric element and a diode sensor.

FIG. 10 is a flowchart showing in detail the data input operation (S108 in FIG. 6) of the microcomputer from the pyroelectric element 3 and diode sensor 6. On condition that the chopper disc 1 is in an open state (S302), the microcomputer receives data from the pyroelectric element 3 and diode sensor 6 (S304), and stores the maximum value of data from the pyroelectric element 3 (S306) and also stores the data from the diode sensor 6 (S308).

Figure 11:
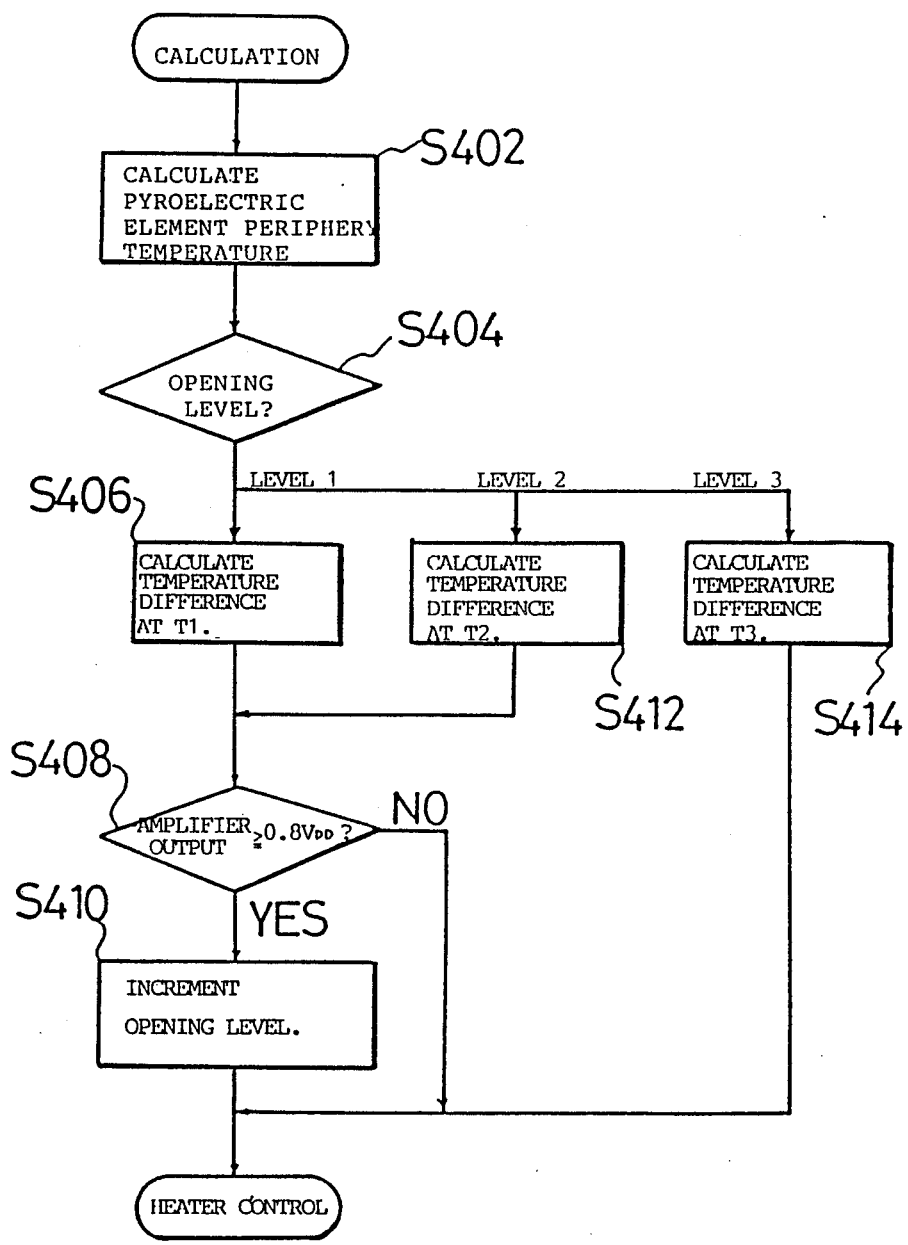
FIG. 11 is a flowchart showing in detail the calculation process (S110 in FIG. 6) for evaluating the temperature difference between the pyroelectric element and diode sensor and the temperature in the periphery of the element.

FIG. 11 is a flowchart showing in detail the process (S110 in FIG. 6) of calculating the relative temperature difference between the heat roller 901 and the periphery of the pyroelectric element 3 and the temperature in the periphery of the pyroelectric element. First, the temperature in the periphery of the pyroelectric element 3 is calculated basing on the data from the diode sensor 6 (S402). Subsequently, the open level is judged (S404), and the microcomputer evaluates the relative temperature difference between the heat roller 901 and the periphery of the pyroelectric element 3 basing on the data from the pyroelectric element 3 and the data stored in the microcomputer 700 in correspondence to the level 1, level 2 and level 3 (S406, S412, S414).

The next step S408 tests the level of the signal from the pyroelectric element 3 via the amplifier in the processing circuit 400 (see FIG. 5). If the signal level has the following relation with the amplifier saturation voltage VDD:

Amplifier output level $\geq 0.8$ VDD     (4)

It is determined that the temperature measuring range by an opening level has become inappropriate and the sequence proceeds to step S410 to raise the opening level by one. Namely, the step S408 corresponds to the level detection means 5 shown in FIG. 1, and the procession from step S408 to S410 corresponds to the interruptive time switching signal. The setting of the opening level in S410 is the selection of one of tables of interruptive time stored in advance in the microcomputer 700.

Figure 12:
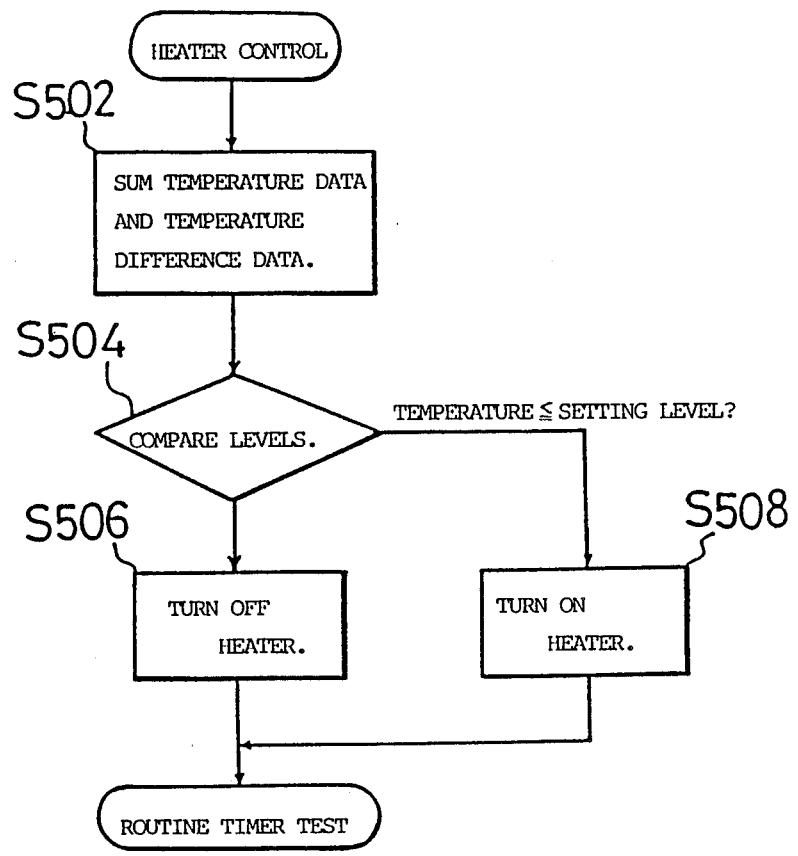
FIG. 12 is a flowchart showing in detail the power on/off control for the heater, the process corresponding to S112 in FIG. 6.
Figure 13:
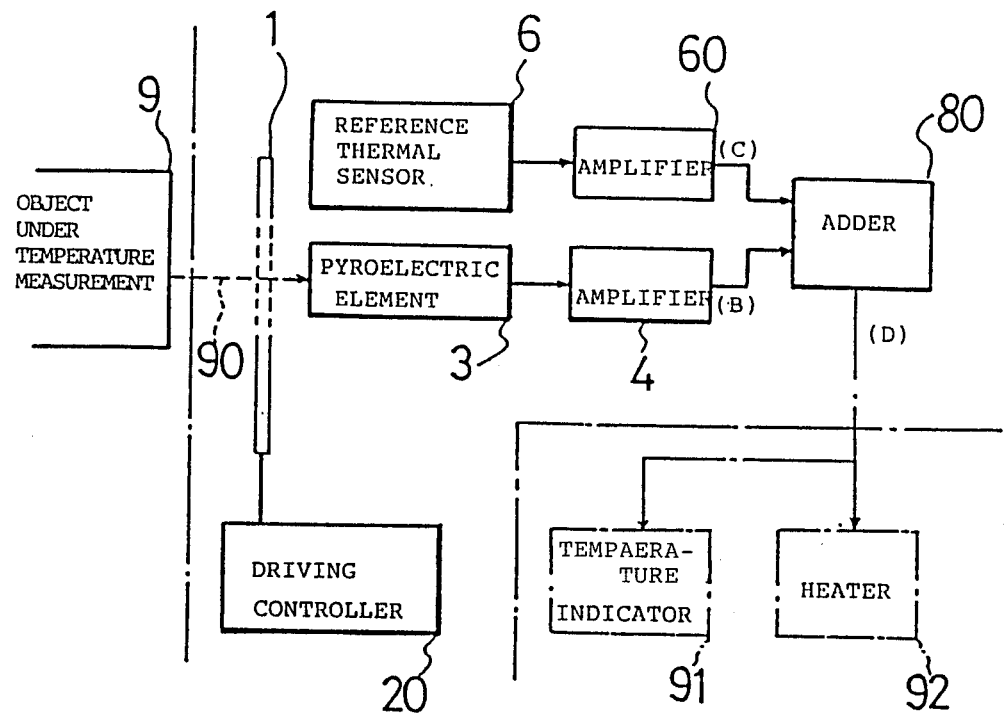
FIG. 13 is a diagram explaining the structure of the conventional pyroelectric thermal sensor.
Figure 14:
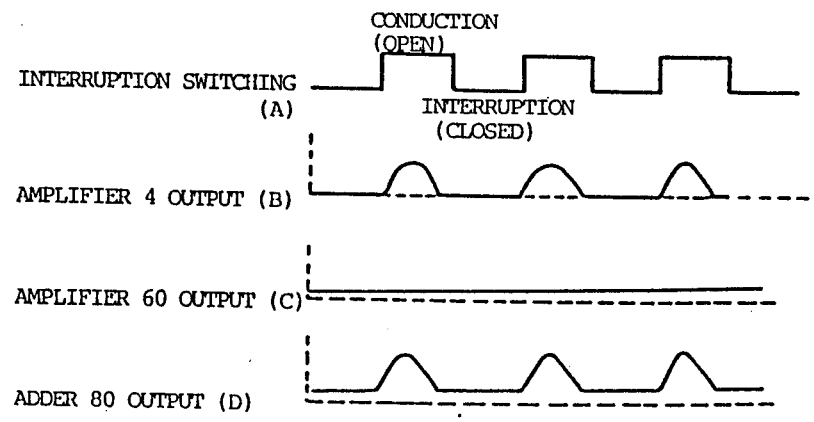
FIG. 14 is a waveform diagram showing the outputs at various portions in FIG. 13.
Figure 15:
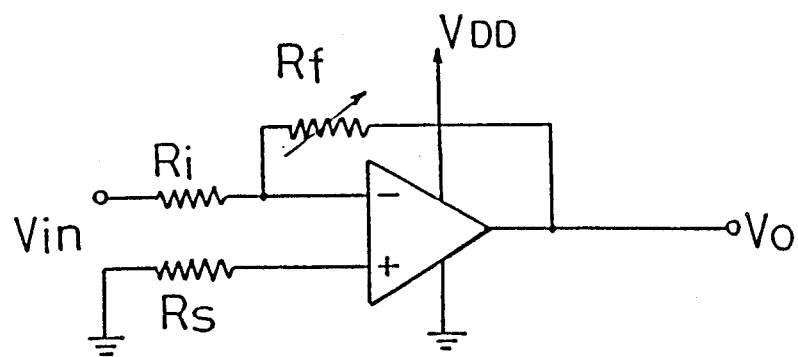
FIG. 15 is a schematic diagram of a commonly used amplifier.
Figure 16:
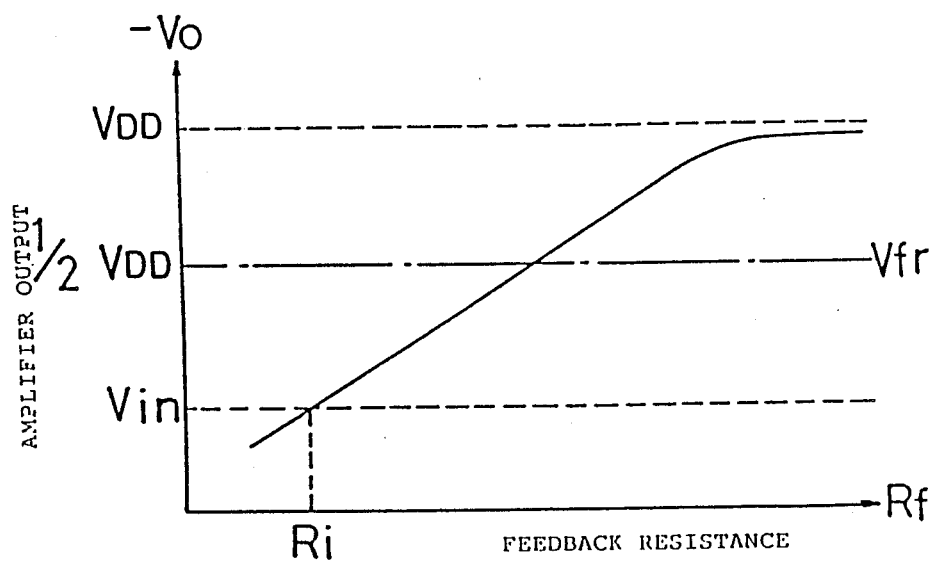
FIG. 16 is a diagram explaining the output level of the amplifier.

FIG. 12 is a flowchart showing in detail the power on/off control for the heater 92, and this process corresponds to step S112 in FIG. 6. The first step S502 calculates the sum of the temperature of the periphery of the pyroelectric element 3 obtained in step S402 in FIG. 11 and the temperature difference between the heat roller 901 and the periphery of the pyroelectric element 3 obtained in step S406 (or S412, S414) so as to evaluate the surface temperature of the heat roller 901. The next step S504 compares the surface temperature of the heat roller 901 with a certain predetermined temperature level, and if the former is found higher than the latter, the heater 92 is turned off in step S506, or if the former is lower, the heater 92 is turned on in step S508. In this way, the surface temperature of the heat roller 901 is maintained closely at the predetermined temperature.

The heat roller temperature control using the pyroelectric thermal sensor is carried out as described above. In the second and following cycles in the flowchart shown in FIG. 6, the steps S222, S224 and S226 in FIG. 7 are selected in accordance with the opening level which has been set in S410 of FIG. 11 so as to obtain a time data defining the open time length. Similarly, the steps S406, S412 and S414 in fig.11 are selected for processing the signals from the pyroelectric element 3.

What is claimed is
1. A pyroelectric thermal sensor comprising:
   a heat ray interrupting means for interrupting a heat ray radiated from a surface of an object under temperature measurement;
   a driving controller for driving said interrupting means in a preset interruptive time;
   a pyroelectric element disposed in the rear of said heat ray interrupting means for producing an electrical signal at a level corresponding to a periphery temperature and an intensity of said heat ray incident through said interrupting means;
   an amplifier for amplifying said electrical signal produced by said pyroelectric element;
   a level detection means which detects the level of the output signal of said amplifier and produces a switching signal when the level of said output signal has reached a predetermined value;
   a reference thermal sensor which produces an electrical signal at a level corresponding to a temperature in the periphery of said pyroelectric element;

a changing means which receives said switching signal for changing the amount of said electrical signal produced by said pyroelectric element to the amplifier; and a temperature calculation means which calculates the surface temperature of said object from the electrical signals provided by said amplifier and said reference thermal sensor and said switching signal.

2. A pyroelectric thermal sensor comprising:

a heat ray interrupting means for interrupting a heat ray radiated from a surface of an object under temperature measurement;

a driving controller for driving said interrupting means in a preset interruptive time;

a pyroelectric element disposed in the rear of said heat ray interrupting means for producing an electrical signal at a level corresponding to a periphery temperature and an intensity of said heat ray incident through said interrupting means;

an amplifier for amplifying said electrical signal produced by said pyroelectric element;

a level detection means which detects the level of the output signal of said amplifier and produces an interruptive time switching signal when the level of said output signal has reached a predetermined value;

a reference thermal sensor which produces an electrical signal at a level corresponding to a temperature in the periphery of said pyroelectric element;

an interruptive time setting means which receives said interruptive time switching signal, sets said preset interruptive time for said interrupting means, and issues an interruptive time setting signal to said driving controller; and a temperature calculation means which calculates the surface temperature of said object from the electrical signals provided by said amplifier and said reference thermal sensor and said preset interruptive time.

3. A pyroelectric thermal sensor according to claim 2, wherein said interruptive time setting means sets a conduction time and non-conduction time as said interruptive time.

4. A pyroelectric thermal sensor according to claim 2, wherein said interruptive time setting means sets an interrupting frequency.

5. A pyroelectric thermal sensor according to claim 2, wherein said interruptive time setting means selects one of a plurality of preset interruptive times sequentially in response to said interruptive time switching signal.

6. A pyroelectric thermal sensor according to claim 2, wherein said interruptive time becomes shorter progressively at each entry of said interruptive time switching signal.

* * * * *